US012234795B2

(12) United States Patent
Leukart et al.

(10) Patent No.: US 12,234,795 B2
(45) Date of Patent: Feb. 25, 2025

(54) FUEL INJECTOR

(71) Applicant: Robert Bosch GmbH, Stuttgart (DE)

(72) Inventors: Michael Leukart, Dusslingen (DE); Fabian Wolf, Renningen (DE); Ferdinand Nicolai, Stuttgart (DE); Ulrich Lessing, Weiler Im Allgaeu (DE)

(73) Assignee: Robert Bosch GmbH, Stuttgart (DE)

( * ) Notice: Subject to any disclaimer, the term of this patent is extended or adjusted under 35 U.S.C. 154(b) by 538 days.

(21) Appl. No.: 17/627,955

(22) PCT Filed: Jul. 8, 2020

(86) PCT No.: PCT/EP2020/069222
§ 371 (c)(1),
(2) Date: Jun. 3, 2022

(87) PCT Pub. No.: WO2021/008961
PCT Pub. Date: Jan. 21, 2021

(65) Prior Publication Data

US 2022/0298999 A1 Sep. 22, 2022

(30) Foreign Application Priority Data

Jul. 17, 2019 (DE) ..................... 10 2019 210 551.3

(51) Int. Cl.
*F02M 61/18* (2006.01)
*F02M 61/04* (2006.01)
*F02M 61/12* (2006.01)

(52) U.S. Cl.
CPC ...... *F02M 61/1886* (2013.01); *F02M 61/042* (2013.01); *F02M 61/12* (2013.01); *F02M 61/1893* (2013.01); *F02M 2200/06* (2013.01)

(58) Field of Classification Search
CPC .. F02M 61/1886; F02M 61/042; F02M 61/12; F02M 61/1895; F02M 2200/06
(Continued)

(56) References Cited

FOREIGN PATENT DOCUMENTS

| | | | |
|---|---|---|---|
| CN | 108533432 | A | 9/2018 |
| DE | 10242685 | A1 | 3/2004 |

(Continued)

OTHER PUBLICATIONS

Translation of International Search Report and Written Opinion for Application No. PCT/EP2020/069222 dated Sep. 16, 2020 (7 pages).

*Primary Examiner* — Mahmoud Gimie
(74) *Attorney, Agent, or Firm* — Michael Best & Friedrich LLP

(57) ABSTRACT

The invention relates to a fuel injector (10), comprising a nozzle body (12) in which a blind hole (19) is formed, wherein at least one injection opening (14) leads off same, comprising a nozzle needle (25; 25*a* to 25*c*) that is reciprocatingly movable along a longitudinal axis (18), wherein the nozzle needle (25; 25*a*-25*c*) has a valve seat (29) which forms a sealing seat (26) with a seating surface (21) in the nozzle body (12) in a lowered position of the nozzle needle (25; 25*a*-25*c*), and comprising at least one borehole (34; 34*a*-34*c*) in the nozzle needle (25; 25*a*-25*c*), wherein at least some portions of a borehole inlet (36) of the at least one borehole (34; 34*a*-34*c*) are located in the region of the seating surface (21) when the sealing seat (26) is formed, and a borehole outlet (40) of the at least one borehole (34; 34*a*-34*c*) is located below the valve seat (29) of the nozzle needle (25; 25*a*-25*c*) in the direction of the longitudinal axis (18).

13 Claims, 3 Drawing Sheets

(58) Field of Classification Search
USPC ........................................................ 239/585.1
See application file for complete search history.

(56) References Cited

FOREIGN PATENT DOCUMENTS

| | | | | | |
|---|---|---|---|---|---|
| EP | 1380750 | A1 | | 1/2004 | |
| EP | 1433935 | A2 | | 6/2004 | |
| EP | 2428672 | A2 | | 3/2012 | |
| JP | H09195892 | A | | 7/1997 | |
| WO | WO-02077445 | A1 | * | 10/2002 | ........... F02M 61/047 |
| WO | 03098031 | A1 | | 11/2003 | |

* cited by examiner

FUEL INJECTOR

BACKGROUND

The invention relates to a fuel injector of the kind used, in particular, as a component of a common rail injection system for the injection of fuel into the combustion chamber of a self-ignition internal combustion engine.

A fuel injector is known from FIG. 2 of DE 102 42 685 A1. The known fuel injector is distinguished by a nozzle needle, the needle tip of which has two conical sections with differently sized cone angles in the direction of a blind hole bottom of a nozzle body. An annular groove extending radially around a longitudinal axis of the nozzle needle is formed in the region of a valve seat surface of the needle tip which, in the lowered state of the nozzle needle, forms a sealing seat with a conical surface in the nozzle body. In the region of the annular groove there is a bore inlet of a bore which has a bore outlet either in the region of that end face of the needle tip which faces the blind hole bottom or else laterally close to the region of the end face of the needle tip. The bore provided in the known fuel injector aims to achieve as constant as possible opening dynamics of the nozzle needle over the entire service life of the fuel injector.

SUMMARY OF THE INVENTION

The fuel injector according to the invention has the advantage that, in addition to simplified production of the nozzle needle, it reduces a tendency for cavitation due to bubble formation of the fuel, particularly in the case of small strokes or during the opening and closing of the nozzle needle, to such an extent that no cavitation damage results therefrom in the region below the sealing seat in the region of the blind hole and particularly also not in the region of the injection openings. Furthermore, the fuel injector has the advantage that movement of the nozzle needle away from the axis during opening is counteracted.

The invention is based on the idea that the advantages described can be achieved by either reducing the flow rate when the nozzle needle is opened and thus the tendency for eddy formation with the resulting cavitation phenomena, and/or by better guiding the flow of the fuel in the case of small strokes of the nozzle needle, and/or by subjecting the fuel to less pronounced deflections, and/or by implementing a changed flow path of the fuel.

In view of the above, the teaching of the invention proposes that the nozzle needle has, from the region of the valve seat surface to an end face facing the blind hole, a conical or frustoconical needle tip with a constant angle, that the bore inlet emerges in the region of the valve seat surface, and that the blind hole has, in the region of the sealing seat, a first section with a first angle with respect to the longitudinal axis of the nozzle body, which is adjoined in the direction of a blind hole bottom by a second section with a second angle, wherein the second angle is smaller than the first angle in relation to the longitudinal axis.

In contrast to the prior art mentioned above, such a configuration of the nozzle needle thus dispenses with a longitudinal groove extending radially around the longitudinal axis of the nozzle needle and with angles of different magnitude in the region of the needle tip of the nozzle needle, making their production relatively simple.

In a first design embodiment or arrangement of the at least one bore in the nozzle needle, provision is made for the at least one bore to be designed as a rectilinear bore and to be arranged at an oblique angle of the nozzle needle with respect to the longitudinal axis. Such an arrangement optimizes the flow guidance of the fuel through the bore by virtue of the fact that only small deflections of the flow path for the fuel are achieved. Moreover, such a bore is also relatively simple to produce in terms of manufacturing technology.

In the last-mentioned embodiment or arrangement of the bore in the nozzle needle, it is very particularly preferred if the oblique angle of the at least one bore is matched to or corresponds to an oblique angle of the at least one injection opening in the nozzle body. As a result, the flow is not deflected or deflected only slightly when flowing out of the bore in the direction of the at least one injection opening, resulting in optimization of the flow guidance and thus a reduction in eddy formation.

For this purpose, it is also advantageous, in particular, if the bore outlet of the at least one bore is arranged at the height of the injection opening or between the injection opening and the blind hole bottom when the nozzle needle is in the lowered position. As a result, the height offset between the bore outlet of the at least one bore and the at least one injection opening, when viewed in the direction of the longitudinal axis of the nozzle needle, is minimized when the nozzle needle is opened.

A further optimization of the alignment of the bore outlet of the at least one bore with the at least one injection opening in the nozzle body envisages that the nozzle needle is arranged in a rotationally fixed manner in relation to its longitudinal axis, and that the bore outlet of the at least one bore is aligned with an inlet region of the at least one injection opening in the nozzle body. In other words, this means that the bore outlet of the bore in the nozzle needle is aligned with the inlet region of the at least one injection opening in respect of the angular position about the longitudinal axis, thus allowing almost direct flow of the fuel from the region of the nozzle needle into the region of the injection opening.

In an alternative arrangement of the at least one bore, provision can be made for the bore outlet of the at least one bore to emerge in the region of that end face of the needle tip which faces the blind hole bottom. Such an embodiment or arrangement of the at least one bore can possibly be implemented even more simply from a manufacturing point of view than the abovementioned proposals, in which the bore outlet is located on a lateral surface of the needle tip.

Particularly if a plurality of bores is provided in the nozzle needle, it may be advantageous if the bores do not intersect the longitudinal axis of the nozzle needle. This allows independent flow guidance of the fuel in the individual bores.

A further advantageous embodiment of the bore, in which its bore outlet is located in the region of that end face of the needle tip which faces the blind hole bottom, envisages that the at least one bore has a plurality of bore sections, wherein a first bore section, which faces the end face of the needle tip, extends concentrically with respect to the longitudinal axis of the nozzle needle.

In a first embodiment, such a bore section, on the side of the needle tip which faces away from the end face, can open into a transverse bore as a second bore section, which extends perpendicularly to the longitudinal axis and passes through the nozzle needle. Such an arrangement or design of the second bore section can be achieved relatively easily in terms of production engineering. However, in order to optimize the flow guidance, provision can alternatively be made, on the side which faces away from the end face of the needle tip, for the first bore section to be connected to at least one bore, which is arranged at an oblique angle with respect to the longitudinal axis and opens into the valve sealing surface.

In order to allow flow to the nozzle needle from below or from the side of the blind hole bottom in the case of small opening strokes of the nozzle needle, provision is made for the end face of the needle tip to be arranged on that side of an upper injection opening edge of the injection opening which faces the blind hole bottom when the nozzle needle is partially open, in which case the ratio of the annular flow cross section between the nozzle needle and the nozzle body is less than 1.5 times the total area of the cross-sectional areas of the injection openings.

Finally, irrespective of the specific arrangement or design of the at least one bore in the nozzle needle, a further embodiment of the invention proposes that the bore inlet of the at least one bore is arranged in the transitional region between the seat surface arranged at different angles and the section of the nozzle body which adjoins it in the direction of the blind hole bottom when the sealing seat is formed.

Finally, a further embodiment that is preferred in terms of design proposes that the diameter of the at least one bore in the nozzle needle is less than or equal to the diameter of the at least one injection opening.

BRIEF DESCRIPTION OF THE DRAWINGS

Further advantages, features and details of the invention will become apparent from the following description of preferred exemplary embodiments and with reference to the drawings.

DETAILED DESCRIPTION

Figure 1:
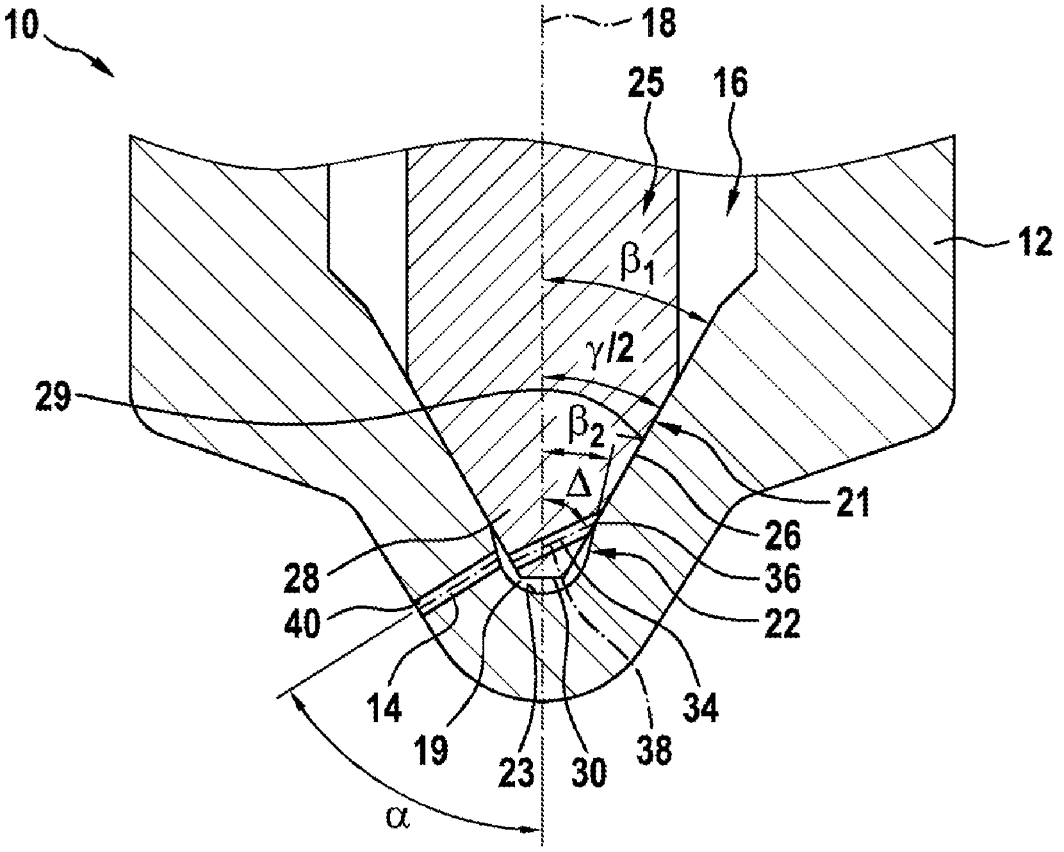
FIG. 1 to FIG. 4 each show an axial end section of a fuel injector with different embodiments of bores in a nozzle needle in longitudinal section and FIG. 5 shows the fuel injector according to FIG. 3 in a partially raised position of its nozzle needle.

In the figures, identical elements or elements having the same function are provided with the same reference numerals.

FIG. 1 illustrates the axial end region of a fuel injector 10 which faces a combustion chamber (not shown) of a self-ignition internal combustion engine. The fuel injector 10 has a nozzle body 12, in the wall of which at least one, preferably a plurality of, injection openings 14 is formed. Fuel at high pressure can be injected into the combustion chamber of the internal combustion engine from a high-pressure chamber 16 of the nozzle body 12 via the at least one injection opening 14. The injection opening 14 extends at an oblique angle $\alpha$ with respect to a longitudinal axis 18 of the nozzle body 12. In addition, to form the high-pressure chamber 16, the nozzle body 12 has a recess 20, which, on the side facing the injection opening 14, has a conical seat surface 21 with a first angle $\beta_1$, which is formed in relation to the longitudinal axis 18, and which, in the direction of a blind hole bottom 23 of a blind hole 19 of the recess 20, merges into a conical section 22 with a second angle $\beta_2$. In this case, the second angle $\beta_2$ is smaller than the first angle $\beta_1$. Furthermore, by way of example, the injection opening 14 extends from the region of the section 22.

The nozzle body 12 interacts with a nozzle needle 25, which is arranged so as to be movable in the direction of the longitudinal axis 18 and concentrically with the longitudinal axis 18. The nozzle needle 25, which is moved in a manner known per se by means of an actuator (not illustrated), for example a magnetic actuator, is illustrated in the figures in a lowered position, forming a sealing seat 26 with the nozzle body 12 in the region of the seat surface 21. In this position, the at least one injection opening 14 is at least indirectly closed, ensuring that no fuel passes from the region of the high-pressure chamber 16 into the region of the injection opening 14.

The nozzle needle 25 has a needle tip 28, which has a valve seat surface 29 of conical or frustoconical shape or of conical design in longitudinal section with an angle $\gamma/2$ with respect to the longitudinal axis 18 which is matched to or corresponds to the angle $\beta_1$ of the seat surface 21 of the nozzle body 12. The needle tip 28 has a flat end face 30 on the side facing the blind hole bottom 23.

In the region of the needle tip 28, at least one rectilinear bore 34 is formed in the nozzle needle 25, which bore is arranged at an oblique angle $\Delta$ in relation to the longitudinal axis 18, wherein the angle $\Delta$ is preferably matched to the angle $\alpha$ of the injection opening 14 or corresponds thereto. The diameter of the at least one bore 34 is at most as large as the diameter of the injection opening 14.

The bore 34 has a bore inlet 36 which is arranged in the transitional region between the seat surface 21 and the section 22 of the nozzle body 12 when the nozzle needle 25 is lowered. Furthermore, the bore inlet 36 starts from the conical valve seat surface 29. A longitudinal axis 38 of the bore 34 preferably intersects the transition between the seat surface 21 and the section 22. In the exemplary embodiment illustrated, a bore outlet 40 of the bore 34 emerges at approximately the height of the injection opening 14 on the side of the nozzle body 12 which faces the blind hole 19.

Furthermore, provision can be made for the nozzle needle 25 to be arranged in a rotationally fixed manner in relation to the longitudinal axis 18, in which case the bore outlet 40 of the bore 34 is then aligned with the opening of the injection opening 14 in the region of the nozzle body 12 in respect of the angular position about the longitudinal axis 18.

Figure 2:
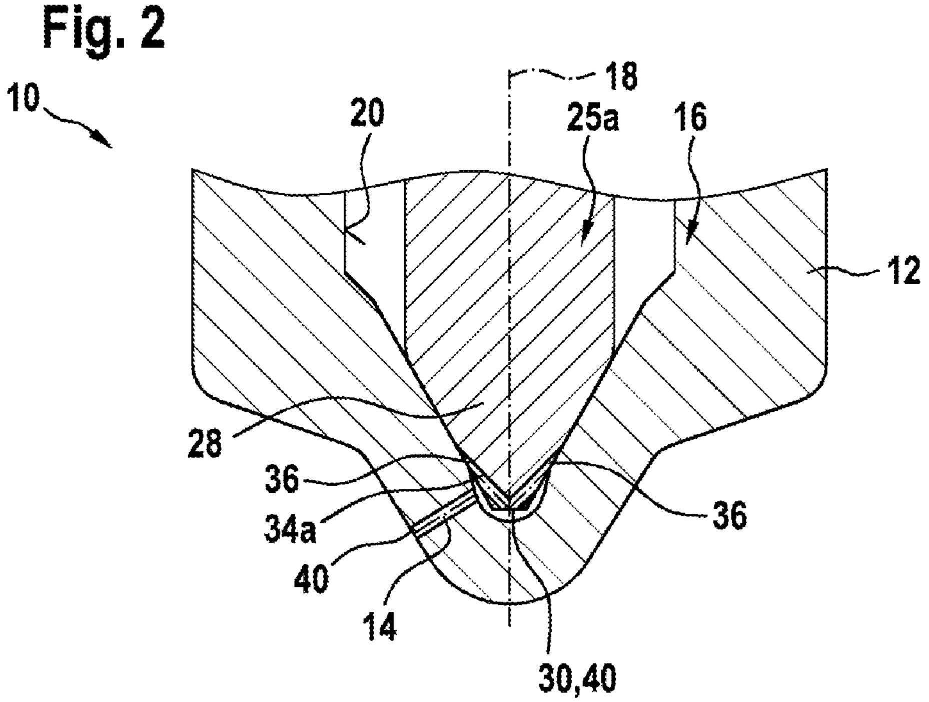

FIG. 2 illustrates a nozzle needle **25*a* in which the rectilinear bore 34*a* emerges with its bore outlet 40 in the region of the end face 30 of the nozzle needle 25*a*. In relation to the nozzle body 12, the bore inlet 36 is arranged in a manner corresponding to nozzle needle 25 when the nozzle needle 25*a*** is lowered.

Figure 3:
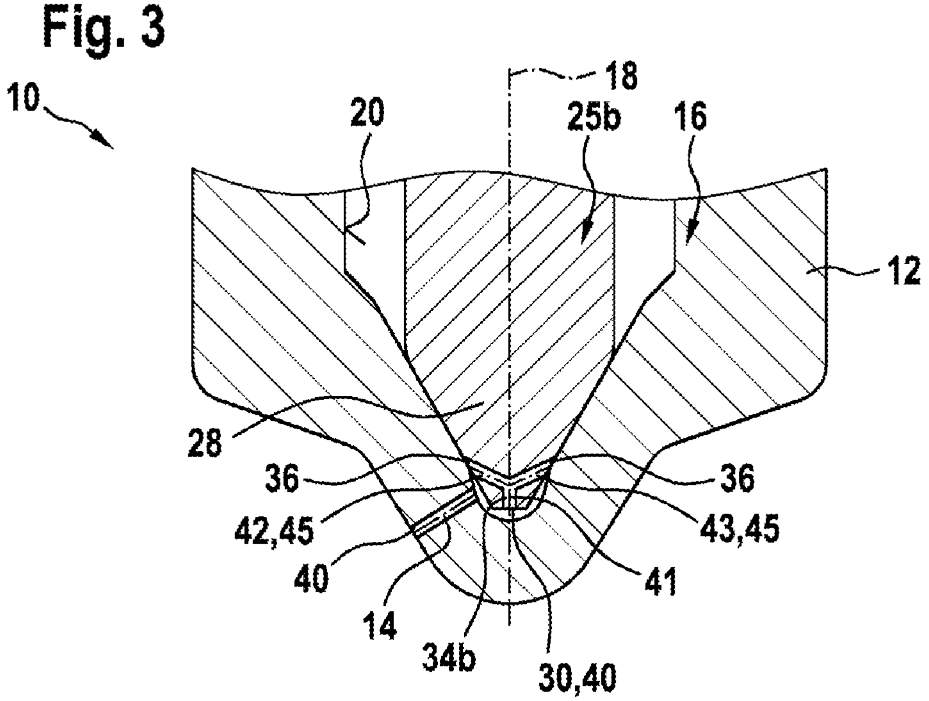

FIG. 3 shows a nozzle needle **25*b* in which the bore 34*b* has a first bore section 41, which extends concentrically with the longitudinal axis 18 and emerges in the region of the end face 30 of the needle tip 28. On the side of the first bore section 41 which faces away from the end face 30, it opens into (at least) two bores 42, 43, which are each arranged at an oblique angle with respect to the longitudinal axis 18 and form second bore sections 45. In relation to the nozzle body 12, the bore inlets 36 are arranged in a manner corresponding to nozzle needles 25 and 25*a* when the nozzle needle 25*b*** is lowered.

Figure 4:
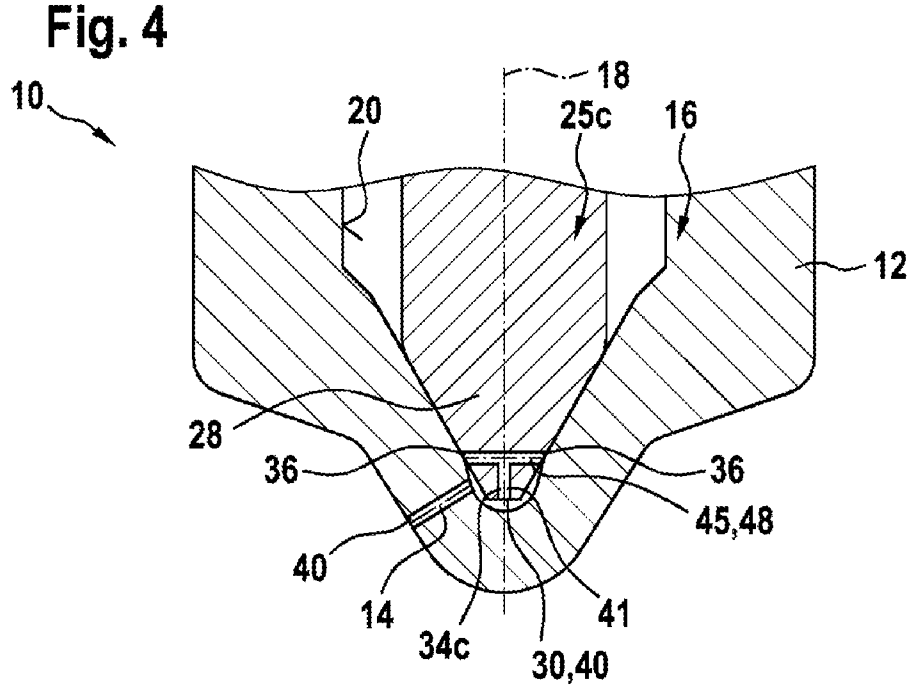

FIG. 4 shows a nozzle needle **25*c* that differs from nozzle needle 25*b* in that the bore 34*c* likewise has the first bore section 41, but the latter opens into a transverse bore 48, as the second bore section 45, that passes through the needle tip 28 and is arranged perpendicular to the longitudinal axis 18. Here too, the bore inlets 36 are arranged in a manner corresponding to nozzle needles 25, 25*a* and 25*b* in relation to the nozzle body 12 when the nozzle needle 25*c*** is lowered.

Figure 5:
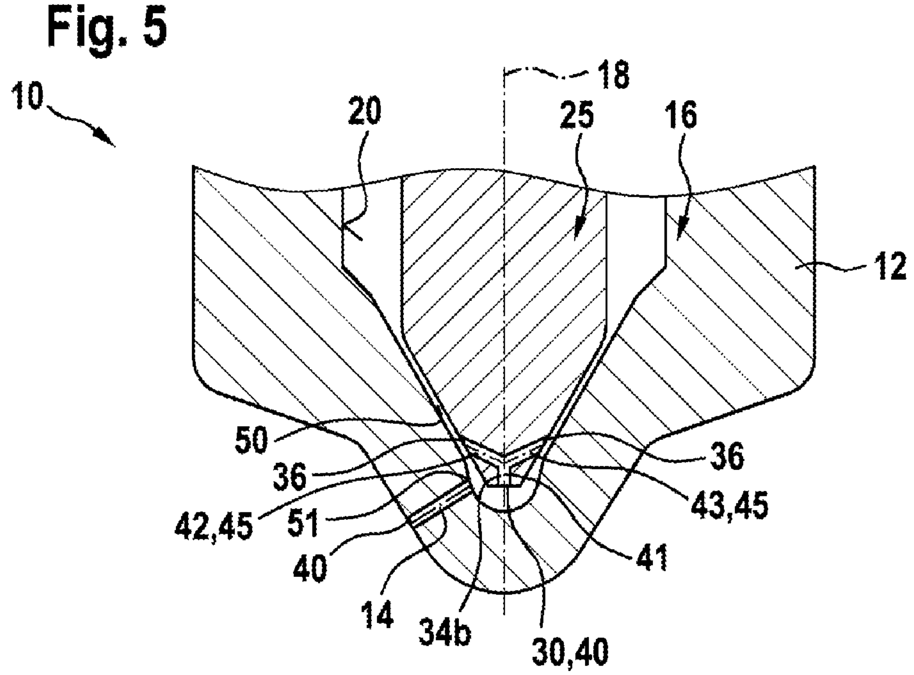

Finally, FIG. 5 shows the fuel injector according to FIG. 3 with the nozzle needle **25*b* raised from the sealing seat 26 but not completely raised. In this position of the nozzle needle 25*b*, an area ratio between a seat surface $A_{Sitz}$ in the region of an annular inlet gap 50 between the nozzle needle 25***b* and the nozzle body 12 and the total cross-sectional areas $A_{SI}$ of the injection opening(s) 14 is less than 1.5, that is to say $A_{Sitz}<1.5\times A_{SI}$. In this case, the end face 30 of the nozzle needle 25*b* is located on that side of an upper inlet edge 51 of the at least one injection opening 14 which faces the blind hole bottom 23.

The fuel injector 10 described so far can be changed or modified in a variety of ways without departing from the concept of the invention. For example, the geometry of the recess 20 in the region of the blind hole 19 can be designed differently. Moreover, the bore inlet 36 can be arranged just below or above the transition from the seat surface 21 to the section 22.

What is claimed is:

1. A fuel injector (10) comprising a nozzle body (12), in which a blind hole (19) is formed, wherein at least one injection opening (14) leads off from the blind hole, a nozzle needle (25; 25*a* to 25*c*), configured to be moved in a reciprocating manner along a longitudinal axis (18), wherein the nozzle needle (25; 25*a* to 25*c*) has a valve seat surface (29), which forms a sealing seat (26) with a seat surface (21) in the nozzle body (12) in a lowered position of the nozzle needle (25; 25*a* to 25*c*), and at least one bore (34; 34*a* to 34*c*) in the nozzle needle (25; 25*a* to 25*c*), wherein at least some portions of a bore inlet (36) of the at least one bore (34; 34*a* to 34*c*) are arranged in a region of the seat surface (21) when the sealing seat (26) is formed, and a bore outlet of the at least one bore (34; 34*a* to 34*c*) is arranged below the valve seat surface (29) of the nozzle needle (25; 25*a* to 25*c*) in a direction of the longitudinal axis (18), wherein the nozzle needle (25; 25*a* to 25*c*) has, from a region of the valve seat surface (29) to a flat end face (30) facing the blind hole (19), a frustoconical needle tip (28) with a constant angle ($\gamma$), wherein the bore inlet (36) extends from the region of the valve seat surface (29), and wherein the blind hole (19) has, in a region of the sealing seat (26), a section with a first angle ($\beta_1$) with respect to the longitudinal axis (18), which is adjoined in the direction of a blind hole bottom (23) by a section (22) with a second angle ($\beta_2$), wherein the second angle ($\beta_2$) is smaller than the first angle ($\beta_1$) in relation to the longitudinal axis (18).

2. The fuel injector as claimed in claim 1, wherein the at least one bore (34) is a rectilinear bore (34; 34*a*) and is arranged at an oblique angle ($\Delta$) with respect to the longitudinal axis (18).

3. The fuel injector as claimed in claim 2, wherein the oblique angle ($\Delta$) of the at least one bore (34) corresponds to an oblique angle ($\alpha$) of the at least one injection opening (14) in the nozzle body (12).

4. The fuel injector as claimed in claim 2, wherein the bore outlet of the at least one bore (34) is arranged at a height of the at least one injection opening (14) or between the at least one injection opening (14) and the blind hole bottom (23) when the nozzle needle (25) is in the lowered position.

5. The fuel injector as claimed in claim 2, wherein the nozzle needle (25) is arranged in a rotationally fixed manner in relation to the direction of the longitudinal axis (18), and wherein the bore outlet of the at least one bore (34) is located at a height of the at least one injection opening (14) in the nozzle body (12) on a side facing the blind hole (19) when the nozzle needle (25) is lowered.

6. The fuel injector as claimed in claim 1, wherein the bore outlet of the at least one bore (34*a*; 34*b*; 34*c*) emerges in a region of an end face (30) of the frustoconical needle tip (28) which faces the blind hole bottom (23).

7. The fuel injector as claimed in claim 2, wherein the at least one bore (34) does not intersect the longitudinal axis (18).

8. The fuel injector as claimed in claim 6, wherein the at least one bore (34*b*; 34*c*) has a plurality of bore sections (41; 45), wherein a first bore section (41) of the plurality of bore sections faces the end face (30) of the frustoconical needle tip (28) and extends concentrically with respect to the longitudinal axis (18).

9. The fuel injector as claimed in claim 8, wherein, on a side of the frustoconical needle tip (28) which faces away from the end face (30), the first bore section (41) opens into a transverse bore (48) as a second bore section (45) of the plurality of bore sections, wherein the second bore section extends perpendicularly to the longitudinal axis (18) and passes through the nozzle needle (25*c*).

10. The fuel injector as claimed in claim 8, wherein, on a side which faces away from the end face (30) of the frustoconical needle tip (28), the first bore section (41) is connected to at least one bore (42, 43) as a second bore section (45) of the plurality of bore sections, wherein the second bore section is arranged at an oblique angle with respect to the longitudinal axis (18).

11. The fuel injector as claimed in claim 6, wherein the end face (30) of the frustoconical needle tip (28) is arranged on a side of an upper inlet edge (51) of the at least one injection opening (14) which faces the blind hole bottom (23) when the nozzle needle (25*b*; 25*c*) is partially open, in which case a ratio $A_{Sitz}$ is $<1.5\times A_{SI}$, wherein $A_{Sitz}$ is an annular flow cross section between the nozzle needle and the nozzle body and $A_{SI}$ is a total area of cross-sectional areas of the at least one injection opening (14) or injection openings (14).

12. The fuel injector as claimed in claim 1, wherein the bore inlet (36) of the at least one bore (34; 34*a* to 34*c*) is arranged in a transitional region between the seat surface (21) and the section (22) of the nozzle body (12) when the sealing seat (26) is formed.

13. The fuel injector as claimed in claim 1, wherein a diameter of the at least one bore (34; 34*a* to 34*c*) in the nozzle needle (25; 25*a* to 25*c*) is less than or equal to a diameter of the at least one injection opening (14).

* * * * *